US012712682B2

(12) United States Patent
Wen

(10) Patent No.: US 12,712,682 B2
(45) Date of Patent: Aug. 18, 2026

(54) ENHANCEMENTS ON HARQ FEEDBACK

(71) Applicant: Nokia Technologies Oy, Espoo (FI)

(72) Inventor: Pingping Wen, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 271 days.

(21) Appl. No.: 18/714,263

(22) PCT Filed: Nov. 30, 2021

(86) PCT No.: PCT/CN2021/134310
§ 371 (c)(1),
(2) Date: May 29, 2024

(87) PCT Pub. No.: WO2023/097429
PCT Pub. Date: Jun. 8, 2023

(65) Prior Publication Data

US 2025/0030508 A1 Jan. 23, 2025

(51) Int. Cl.
*H04L 1/1867* (2023.01)
*H04L 5/00* (2006.01)
*H04L 69/22* (2022.01)

(52) U.S. Cl.
CPC .......... *H04L 1/1896* (2013.01); *H04L 5/0055* (2013.01); *H04L 69/22* (2013.01)

(58) Field of Classification Search
CPC ...... H04L 1/1896; H04L 5/0055; H04L 69/22
See application file for complete search history.

(56) References Cited

U.S. PATENT DOCUMENTS

2008/0095109 A1 4/2008 Malladi et al.
2009/0097457 A1 4/2009 Papasakellariou et al.
(Continued)

FOREIGN PATENT DOCUMENTS

CN 102332968 A 1/2012
CN 112602280 A 4/2021
(Continued)

OTHER PUBLICATIONS

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)"; 3GPP Tr 36.763 V17.0.0, Jun. 2021, pp. 1-73.
(Continued)

*Primary Examiner* — Kent Krueger
(74) *Attorney, Agent, or Firm* — Barta Jones, PLLC

(57) ABSTRACT

Embodiments of the present disclosure relate to methods, devices, apparatuses, and computer readable medium for enhancements on HARQ feedback. The method comprises: receiving, at a first device and from a second device, first control information for scheduling a second transmission of the second device and feedback information associated with the second transmission, and second control information for scheduling a third transmission of the first device; decoding, based on the second control information, the second transmission from the second device; generating, based on the decoding result, a first transmission comprising the feedback information and the third transmission comprising at least a duplication of the feedback information; transmitting, to the second device and based on the first control information, the first transmission; and transmitting, to the second device and based on the second control information, the third transmission. By providing the duplication of HARQ feedback, the reliability of HARQ feedback is enhanced, which in turn improves the efficiency of DL data transmissions and reduces frequency resources as well as the power consumption.

20 Claims, 7 Drawing Sheets

(56) References Cited

U.S. PATENT DOCUMENTS

| | | | | |
|---|---|---|---|---|
| 2012/0195287 | A1 | 8/2012 | Jung et al. | |
| 2021/0120590 | A1 | 4/2021 | Medles et al. | |
| 2021/0234643 | A1 | 7/2021 | Wang et al. | |
| 2021/0297192 | A1 | 9/2021 | Miao et al. | |
| 2022/0038214 | A1* | 2/2022 | Shrestha | H04L 1/188 |
| 2022/0104306 | A1* | 3/2022 | Shrestha | H04L 1/1812 |

FOREIGN PATENT DOCUMENTS

| | | | |
|---|---|---|---|
| EP | 2348664 | B1 | 5/2013 |
| WO | 2020/197217 | A1 | 10/2020 |
| WO | 2021/033094 | A1 | 2/2021 |
| WO | 2021/189924 | A1 | 9/2021 |

OTHER PUBLICATIONS

"3rd Generation Partnership Project, Technical Specification Group Radio Access Network; Evolved Universal Terrestrial Radio Access (E-UTRA); Physical layer procedures (Release 16)", 3GPP TS 36.213 V16.7.0, Sep. 2021, pp. 1-577.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.6.0, Sep. 2021, pp. 1-1091.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.6.0, Sep. 2021, pp. 1-143.
"Meeting Report for TSG RAN meeting #86", 3GPP TSG RAN meeting #87e, RP-200478, Third Generation Partnership Project (3GPP™), Mar. 16-19, 2020, pp. 1-217.
"New Study WID on NB-IoT/eTMC support for NTN", 3GPP TSG RAN Meeting #86, RP-193235, MediaTek Inc., Dec. 9-31, 2019, 4 pages.
"WID on NB-IoT/eMTC support for NTN", 3GPP TSG RAN Meeting #92-e, RP-211601, MediaTek Inc, Agenda Item: 10.5.1, Jun. 14-18, 2021, 6 pages.
"RAN chair's input for joint CT/RAN/SA session about Rel-18", 3GPP TSG RAN#93-e, RP-211642, RAN Chair, Agenda: 9.0, Sep. 13-17, 2021, pp. 1-6.
"Moderator's summary for discussion [RAN93e-R18Prep-08] NTN evolution"; 3GPP TSG RAN Meeting #93-e, RP-211658, RAN Vice-Chair (AT&T), Agenda Item: 9.0.1, Sep. 13-17, 2021, pp. 1-149.
"3rd Generation Partnership Project; Technical Specification Group Radio Access Network; NR; NR and NG-RAN Overall Description; Stage 2 (Release 16)", 3GPP TS 38.300 V16.7.0, Sep. 2021, pp. 1-152.
"FL summary #1 of AI 8.15.3: Timing relationship for IoT-NTN", 3GPP TSG RAN WG1#104bis-e, R1-21xxxx, Sony, Agenda Item: 8.15.3, Apr. 12-20, 2021, 35 pages.
International Search Report and Written Opinion received for corresponding Patent Cooperation Treaty Application No. PCT/CN2021/134310, dated May 24, 2022, 9 pages.
Extended European Search Report received for corresponding European Patent Application No. 21965877.0, dated Apr. 25, 2025, 10 pages.

* cited by examiner

ENHANCEMENTS ON HARQ FEEDBACK

FIELD

Embodiments of the present disclosure generally relate to the field of telecommunication and in particular, to devices, methods, apparatus and computer readable storage media of enhancements on Hybrid Automatic Repeat Request (HARQ) feedback.

BACKGROUND

In Narrow Band Internet of Things (NB IoT), there is no narrow band physical uplink control channel (NPUCCH) for uplink control information (UCI), such as, HARQ-ACK/NACK feedbacks. Both data transmissions and the UCI are transmitted on narrow band physical uplink shared channel (NPUSCH). Hence, there are two types of NPUSCH, namely, NPUSCH format 1 for uplink (UL) data transmissions, and NPUSCH format 2 for the UCI. NPUSCH format 1 and NPUSCH format 2 are separately scheduled and indicated with different DCI formats. In particular, NPUSCH format 1 scheduling related parameters are included in DCI NO, while both narrow band downlink shared channel transmission (NPDSCH) related parameters and NPUSCH format 2 related parameters are included in DCI N1.

For a DL transmission, after decoding the NPDSCH, the UE will transmit the UCI including the HARQ feedback for the DL transmission in NPUSCH format 2 based on the parameters indicated in DCI N1. In a case where the DL transmission is successfully decoded by the UE, however the HARQ-ACK feedback in NPUSCH format 2 is not correctly decoded by the gNB, the gNB will still allocate the scheduling assignment for retransmission of the previous DL transmission on NPDSCH and NPUSCH format 2 via DCI N1. Such a retransmission is unnecessary, which may cause a waste of resources and delay the successive data transmissions.

SUMMARY

In general, example embodiments of the present disclosure provide a solution for HARQ feedback.

In a first aspect, there is provided a first device. The first device comprises: at least one processor; and at least one memory including computer program codes. The at least one memory and the computer program codes are configured to, with the at least one processor, cause the first device to: receive, from a second device, first control information for scheduling a second transmission of the second device and feedback information associated with the second transmission, and second control information for scheduling a third transmission of the first device; decode, based on the first control information, the second transmission from the second device; generate, based on the decoding result, a first transmission comprising the feedback information and the third transmission comprising at least a duplication of the feedback information; transmit, to the second device and based on the first control information, the first transmission; and transmit, to the second device and based on the second control information, the third transmission.

In a second aspect, there is provided a second device. The second device comprises: at least one processor; and at least one memory including computer program codes. The at least one memory and the computer program codes are configured to, with the at least one processor, cause the second device to: transmit, to a first device, first control information for scheduling a second transmission of the second device and feedback information associated with the second transmission, and second control information for scheduling a third transmission of the first device; transmit, to the first device, the second transmission; receive, from the first device and based on the first control information, the first transmission comprising the feedback information; and receive, from the first device and based on the second control information, the third transmission comprising at least a duplication of the feedback information.

In a third aspect, there is provided a method. The method comprises: receiving, at a first device and from a second device, first control information for scheduling a second transmission of the second device and feedback information associated with the second transmission, and second control information for scheduling a third transmission of the first device; decoding, based on the first control information, the second transmission from the second device; generating, based on the decoding result, a first transmission comprising the feedback information and the third transmission comprising at least a duplication of the feedback information; transmitting, to the second device and based on the first control information, the first transmission; and transmitting, to the second device and based on the second control information, the third transmission.

In a fourth aspect, there is provided a method. The method comprises: transmitting, at a second device and to a first device, first control information for scheduling a second transmission of the second device and feedback information associated with the second transmission, and second control information for scheduling a third transmission of the first device; transmitting, to the first device, the second transmission; receiving, from the first device and based on the first control information, the first transmission comprising the feedback information; and receiving, from the first device and based on the second control information, the third transmission comprising at least a duplication of the feedback information.

In a fifth aspect, there is provided a first apparatus. The first apparatus comprises: means for receiving, from a second apparatus, first control information for scheduling a second transmission of the second apparatus and feedback information associated with the second transmission, and second control information for scheduling a third transmission of the first apparatus; means for decoding, based on the first control information, the second transmission from the second apparatus; means for generating, based on the decoding result, a first transmission comprising the feedback information and the third transmission comprising at least a duplication of the feedback information; means for transmitting, to the second apparatus and based on the first control information, the first transmission; and means for transmitting, to the second apparatus and based on the second control information, the third transmission.

In a sixth aspect, there is provided a second apparatus. The second apparatus comprises: means for transmitting, to a first apparatus, first control information for scheduling a second transmission of the second apparatus and feedback information associated with the second transmission, and second control information for scheduling a third transmission of the first apparatus; means for transmitting, to the first apparatus, the second transmission; means for receiving, from the first apparatus and based on the first control information, the first transmission comprising the feedback information; and means for receiving, from the first apparatus and based on the second control information, the third transmission comprising at least a duplication of the feedback information.

In a seventh aspect, there is provided a non-transitory computer readable medium. The non-transitory computer readable medium comprises program instructions for causing an apparatus to perform the method according to the third aspect.

In an eighth aspect, there is provided a non-transitory computer readable medium. The non-transitory computer readable medium comprises program instructions for causing an apparatus to perform the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
FIG. 1 illustrates a schematic diagram of the conventional DL HARQ feedback mechanism.
Figure 1:
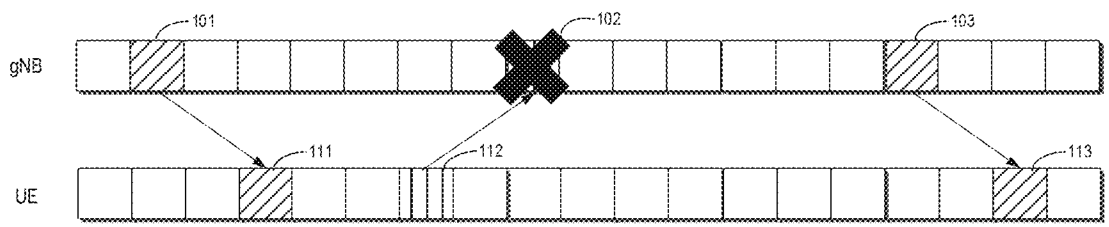

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Non-terrestrial network (NTN), Narrow Band Internet of Things (NB-IoT), IoT over NTN (Internet of Things over Non-terrestrial network) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), a further sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As previously discussed, the unnecessary retransmission of DL transmission cannot be avoided in NB IoT based on the conventional HARQ feedback mechanism. FIG. 1 illustrates a schematic diagram of the conventional DL HARQ feedback mechanism 100. As shown in FIG. 1, the gNB transmits a data transmission on NPDSCH at 101. The UE correctly decodes the data transmission at 111, and thus the HARQ-ACK feedback is transmitted in NPUSCH format 2 at 112. However, the HARQ-ACK feedback is not correctly decoded at 102. In this case, the gNB will still allocate the scheduling assignment for the retransmission of the previous data transmission and NPUSCH format 2 via DCI N1. The gNB may then transmit the retransmission of the data transmission at 103, and the UE has to decode the retransmission of the data transmission at 113. This obviously reduces the efficiency of DL transmission and delays the successive data transmission.

The deployment of NTN has exacerbated the above issue. In particular, NB-IoT and enhanced machine-type communication (eMTC) are supported in NTN, and the satellite can be used for providing coverage beyond terrestrial deployments. The NTN can serve as a complementary manner to the terrestrial networks. As such, in remote areas with low or no cellular connectivity, the IoT operations can still be enabled for many different industries, including but not limited to, transportation (e.g., maritime, road, rail, air transportation) and logistics, solar, oil and gas harvesting, utilities, farming, environment monitoring, mining, and so on.

The NB-IoT UE is assumed to be stationary or with low-mobility in a terrestrial system, and the UE can keep RRC connected for DL/UL data transmissions with less mobility and radio link failure. The UE can be scheduled for DL/UL data transmissions at any time in RRC connected state. However, due to the mobility of the satellite, the issue of unnecessary retransmissions as discussed above may be more serious for IoT over NTN.

First, the movement of non-GEO satellite and discontinues coverage may have a large impact on IoT over NTN. Satellites in non-GEO orbits move with a high speed relative to a fixed position on earth, leading to a frequent and unavoidable handover for both stationary and moving UEs. As the satellite moves with a high speed, the UE served by an NTN LEO cell of a diameter of 50 km and 1000 km may remain in connectivity for a maximum of 6.61 seconds and 132.38 seconds respectively. In this case, the movement of a UE can be neglected. In addition, the radio coverage may not be continuous due to a sparse deployment of satellites. Once the UE loses the satellite coverage, the UE may need to wait for a next satellite to be in coverage. Therefore, the UE should make use of the short coverage time to finish the DL/UL data transmission.

Second, the UE estimates and pre-compensates the timing and frequency offset of the service link based on the Global Navigation Satellite System (GNSS) acquired position and the serving satellite ephemeris with sufficient accuracy for UL transmission. The following agreements related to GNSS measurement and UL synchronization are reached:

A validity timer for UL synchronization configured by the network is recommended.

For a sporadic short transmission, before accessing the network, the UE acquires GNSS position fix and does not need to re-acquire a GNSS position fix for the transmission of the packets.

UE in RRC_CONNECTED should go back to RRC_IDLE mode and re-acquire a GNSS position fix in a case where the GNSS becomes outdated.

Therefore, it is expected that the UE can finish the UL/DL transmission in the GNSS validity timer to avoid an additional procedure, such as, RRC_IDLE to RRC_CONNECTED as well as the re-synchronization, etc. With so many limitations on the DL/UL data transmission, the reliability of HARQ feedback becomes more important for IoT over NTN as compared with the TN system.

In order to solve the above and other potential problems, embodiments of the present disclosure provide an enhanced HARQ feedback mechanism. In the HARQ feedback mechanism, a duplication of HARQ-ACK/NACK is provided to improve the reliability of the HARQ feedback procedure. In this way, the completion of the DL data transmission can be speeded up and the time-frequency resources as well as the power consumption can be reduced.

Figure 2:
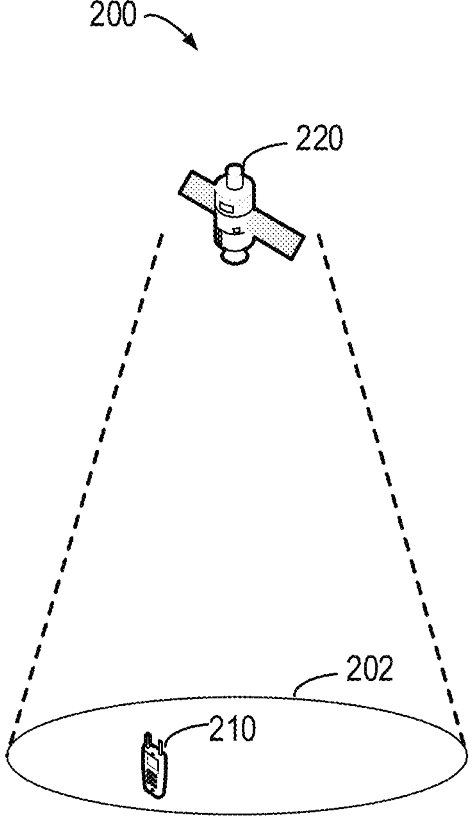
FIG. 2 illustrates an example network environment in which example embodiments of the present disclosure may be implemented.

FIG. 2 illustrates an example network environment 200 in which embodiments of the present disclosure can be implemented. The network environment 200 includes a first device 210 and a second device 220. As shown in FIG. 2, the first device 210 may be implemented as a terminal device, such as, a NB-IoT UE. The second device 220 may be implemented as a network device, such as, a gNB. In the context of the example embodiments, the first device 210 may be also referred to as the UE 210 or the terminal device 210, and the second device 220 may be also referred to as the network device 220 or the gNB 220.

The second device 220 provides radio coverage in a cell 202 where the first device 210 and the second device 220 may communicate with each other via a UL or DL channel. In particular, the direction from the first device 210 to the second device 220 may refer to UL, and the direction from the second device 220 to the first device 210 may refer to DL. In the NTN scenario, the radio coverage may be discontinuous, thus from the perspective of the first device 210, it may expect to finish the DL/UL transmissions when served by the second device 220.

The second device 220 may transmit downlink control information (DCI) of various formats for scheduling different UL/DL transmissions. Table 1 and table 2 show NPUSCH format 1 scheduling related parameters included in DCI NO, and the NPDSCH transmission related parameter and NPUSCH format2 related parameter included in DCI N1, respectively.

TABLE 1

DCI N0 for PUSCH scheduling

| Field | Size (bits) |
|---|---|
| Flag for N0/N1 differentiation | 1 |
| Subcarrier indication | 6 |
| Resource assignment | 3 |
| Scheduling delay | 2 |
| Modulation and Coding Scheme (MCS) | 4 |
| RV | 1 |
| Repetition number | 3 |
| NDI | 1 |
| DCI subframe repetition number | 2 |
| CRC | 16 |
| Total | 39 |

TABLE 2

DCI N1 for PDSCH scheduling and NPDCCH order

| Field | Size (bits) |
|---|---|
| Flag for N0/N1 differentiation | 1 |
| NPDCCH order indicator | 1 |
| Scheduling delay | 3 |
| Resource assignment | 3 |
| MCS | 4 |
| Repetition number | 4 |
| NDI | 1 |
| HARQ-ACK resource | 4 |
| DCI subframe repetition number | 2 |
| CRC | 16 |
| Total | 39 |

In short, DCI NO may be used for scheduling UL data transmission (e.g., NPUSCH format 1), and DCI N1 may be used for scheduling DL data transmission and UCI including the HARQ-ACK/NACK for the DL data transmission (e.g., NPUSCH format 2). In some example embodiments, a duplication of the HARQ-ACK/NACK may be carried on NPUSCH format 1, which will be discussed in detail below.

It should be understood that although the second device 220 is shown as deployed on a satellite, it can be also deployed on the ground. In addition, the network environment 200 may be either a NTN system or a terrestrial system. The example embodiments of the present application are not limited in these regards.

It should be also understood that the number of the devices as shown in FIG. 2 is given only for illustrative purpose without suggesting any limitations. For example, the network environment 200 may include any suitable number of terminal devices and network devices adapted for implementing embodiments of the present disclosure. The present disclosure is not limited in this regard.

The communications in the network environment 200 may conform to any suitable standards including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G), a future sixth generation (6G) and/or any further communication protocols.

Figure 3:
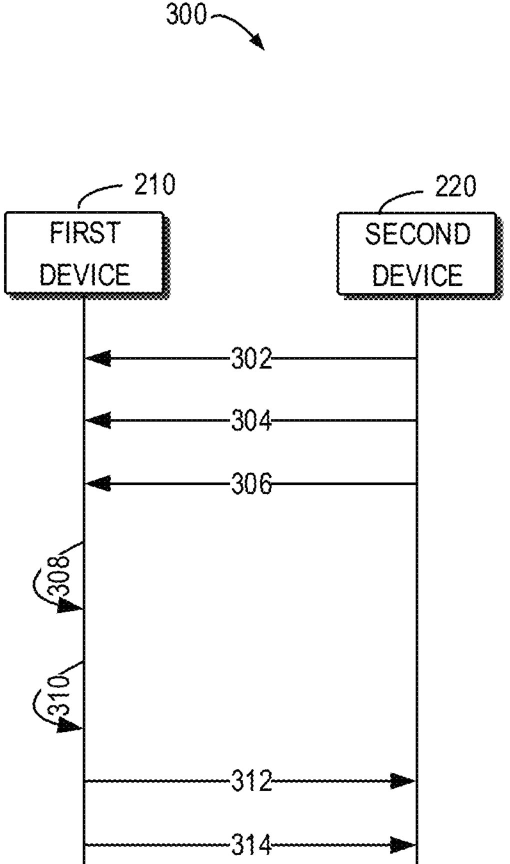
FIG. 3 shows a signaling chart illustrating an enhanced HARQ feedback procedure according to some example embodiments of the present disclosure.

Principle and implementations of the present disclosure will be described in detail below with reference to FIG. 3. FIG. 3 shows a signaling chart illustrating an enhanced HARQ feedback procedure 300 according to some example embodiments of the present disclosure. For the purpose of discussion, the process 300 will be described with reference to FIG. 2. The process 300 may involve the first device 210 and the second device 220.

In the process 300, the second device 220 transmits 302 first DCI for scheduling a DL data transmission and UCI to the first device 210. The UCI may include HARQ-ACK/NACK feedback associated with the DL data transmission. The first DCI may be DCI N1 as shown in table 2. The UCI s to be carried on PUSCH format 2.

The second device 220 transmits 304 second DCI for scheduling a UL data transmission to the first device 210. The second DCI may be DCI N0 as shown in table 1. The UL data transmission is to be carried on PUSCH format 1.

Figure 4:
FIG. 4 illustrates a schematic diagram of an enhanced HARQ feedback mechanism according to some example embodiments of the present disclosure.
Figure 4:
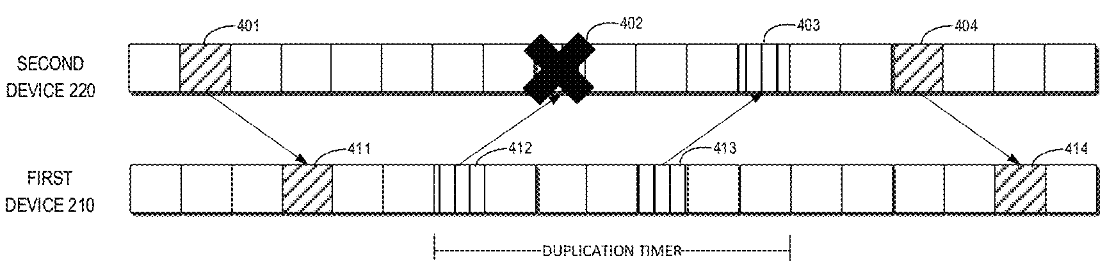

Now reference is made to FIG. 4 to illustrate the UL/DL transmissions between the first device 210 and the second device 220. As shown in FIG. 4, at 401, the second device 220 then transmits 306 the DL data transmission that is scheduled by the first DCI on PDSCH.

The first device 210 decodes 308 the DL data transmission based on the first DCI at 411. The first device 210 may generate 310 a first UL transmission comprising the HARQ feedback associated with the DL data transmission based on the decoding result.

Since the second DCI for scheduling the UL data transmission is received by the first device 210, the first device 210 may also generate a second UL data transmission. In some example embodiments, the second UL data transmission may include the duplication of the HARQ feedback.

In the example shown in FIG. 4, as the DL data transmission is correctly decoded at 411, the first device 210 generates a first UL transmission including the HARQ-ACK feedback associated with the DL data transmission. At 412, the first device 210 transmits 312 the first UL transmission of PUSCH format 2 based on the parameters included in the first DCI.

The first device 210 generates a second UL transmission including the duplication of the HARQ-ACK feedback. At 413, the first device 210 then transmits 314 the second UL transmission of PUSCH format 1 based on the parameters included in the second DCI.

Figure 5:
FIG. 5 illustrates a schematic diagram of an example MAC protocol data unit (PDU) according to some example embodiments of the present disclosure.
Figure 5:
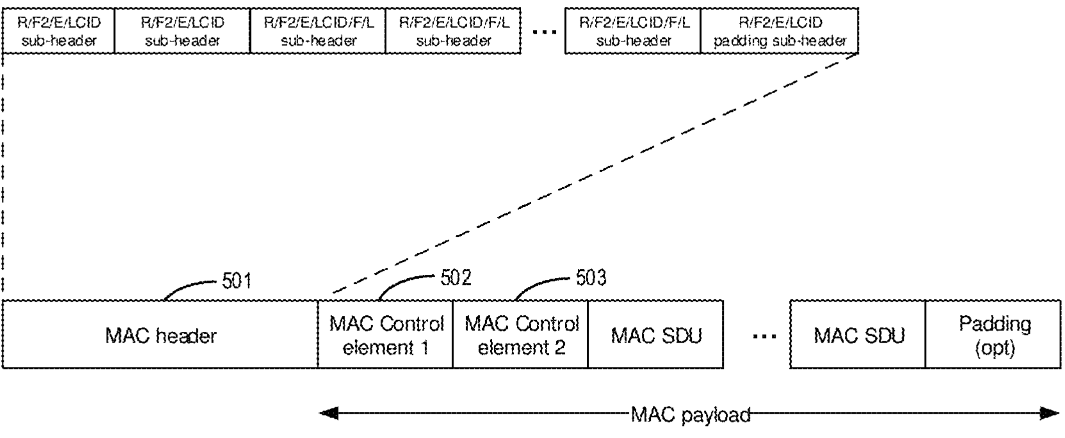

In the enhanced HARQ feedback mechanism, no additional resource needs to be allocated for the duplicated DL HARQ feedback on PUSCH format 1. In some example embodiments, the duplication of the HARQ-ACK feedback may be carried in a MAC protocol data unit (PDU) header on PUSCH format 1, for example, a reserved bit (e.g., R bit) in the MAC PDU header. In some other example embodiments, the duplication of the HARQ-ACK feedback may be carried in an existing MAC control element (CE) or a new MAC CE on PUSCH format 1. With reference to FIG. 5, an example MAC PDU is illustrated according to some example embodiments of the present disclosure. As shown in FIG. 5, the duplication of the HARQ-ACK feedback may be included in either the MAC header 501 or the MAC CE 502 or 503.

For a case that two HARQ processes are configured for the first device 210, there may be two valid duplicated HARQ feedbacks correspondingly. In the embodiments where the duplication of the HARQ feedback is carried in the MAC PDU header, and there is only one R bit in the MAC PDU header, the duplication of the HARQ feedback corresponding to the earlier one of the two HARQ processes may be carried in this bit. Additionally, the duplication of the HARQ feedback corresponding to the later one of the two HARQ processes may be carried in the R bit of a MAC PDU header in a next PUSCH format 1.

Alternatively, if there is more than one R bit in the MAC PDU header, two of the R bits may be used for indicating the duplications of HARQ feedbacks corresponding to the two HARQ processes. The order of the two R bits may be preconfigured at the first device 210 and the second device 220. Alternatively, the order of the two R bits may be indicated by the second device 220.

Alternatively, a duplication of a first HARQ feedback may be carried in a first bit of a MAC CE, and a duplication of a second HARQ feedback may be carried in the a second bit of the MAC CE. The MAC CE may be, for example, one of MAC CEs 502 and 503 as shown in FIG. 5.

Returning back to the example shown in FIG. 4, the HARQ-ACK feedback is not correctly decoded by the second device 220 at 402. Accordingly, the second device 220 may obtain the HARQ feedback associated with the DL data transmission on PUSCH format 1.

At 403, the second device 220 correctly decodes the duplication of the HARQ-ACK feedback carried in the second UL transmission. In this case, a retransmission of the DL data transmission can be avoided. For example, the second device 220 may then transmit a further DL data transmission at 404, and the first device 210 may decode the DL data transmission at 414.

In some example embodiments, the duplication of the HARQ feedback may be associated with a duplication timer, and the duplication of the HARQ feedback is only valid during the duplication timer is running. For example, upon the HARQ feedback associated with the DL data transmission is transmitted based on NPUSCH format 2, the duplication timer may be started. During the duplication timer is running, if a UL transmission based on NPUSCH format 1 is scheduled, the first device 210 may transmit the duplication of the HARQ feedback in the UL transmission. The duration of the duplication timer may be configured by the second device 220.

In a case where the first device 210 is configured with a first HARQ process and a second HARQ process, each of the two HARQ processes may be associated with a corresponding duplication timer, for example, a first duplication timer and a second duplication timer. In this case, the first device 210 may determine whether the first duplication timer and the second duplication timer expire. For example, if the first duplication timer expires, while the second duplication timer does not expire, the first device 210 may transmit only a duplication of the second HARQ feedback corresponding to the second HARQ process in the third transmission. If the second duplication timer expires, while the first duplication timer does not expire, the first device 210 may transmit only a duplication of the first HARQ feedback corresponding to the first HARQ process in the third transmission. If none of the first duplication timer and the second duplication timer expires, the first device 210 may transmit both the duplication of the first HARQ feedback and the duplication of the second HARQ feedback in the third transmission.

According to the example embodiments, there is provided an enhanced HARQ feedback mechanism. In the HARQ feedback mechanism, the HARQ feedback for DL transmission is carried on PUSCH format 2, and the duplication of the HARQ feedback is carried on PUSCH format 1. In this way, the reliability of the DL HARQ feedback can be improved, which in turns speeds up the completion of the DL data transmission, avoids a waste of the time-frequency resources, and reduces the power consumption of the UE. Since the duplicated HARQ feedback can be transmitted by using one or more reserved bits in the MAC PDU header, the HARQ feedback mechanism would not increase the additional resource allocation.

The enhanced HARQ feedback mechanism is especially beneficial to NB-IoT over NTN. Speeding up the DL/UL data transmission not only can reduce the power consumption, but also avoid additional procedures between the gNB and UE, such as, a procedure for re-connecting to a new satellite, a UL re-synchronization procedure when the GNSS or the satellite ephemeris data are outdated.

Figure 6:
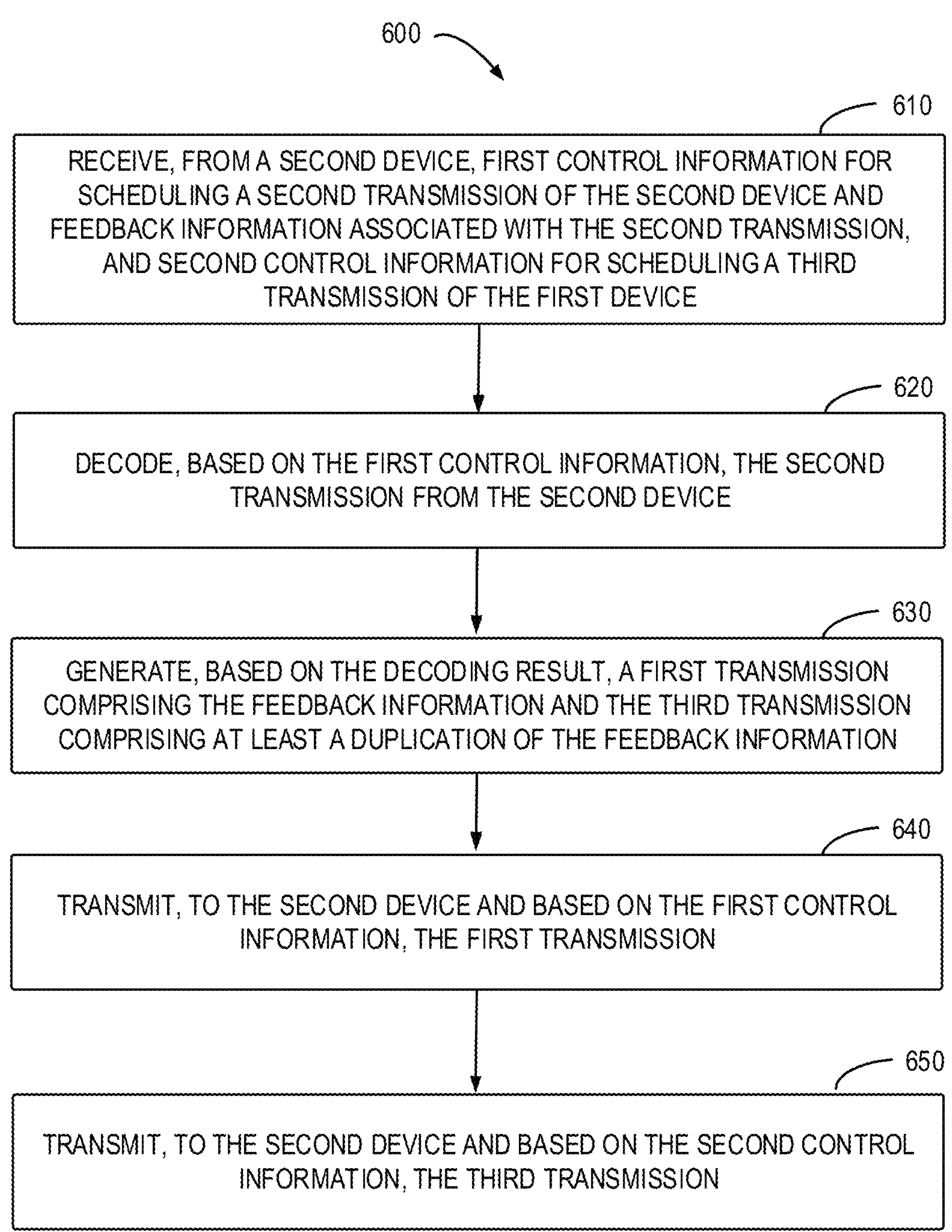
FIG. 6 illustrates a flowchart of an example method implemented at a first device according to example embodiments of the present disclosure.

FIG. 6 illustrates a flowchart of an example method 600 implemented at a first device 210 according to example embodiments of the present disclosure. The method 600 can be implemented by a terminal device (e.g., a UE), for example, the first device 210 shown in FIG. 2. For the purpose of discussion, the method 600 will be described with reference to FIG. 2. It is to be understood that method 600 may further include additional blocks not shown and/or omit some shown blocks, and the scope of the present disclosure is not limited in this regard.

At 610, the first device 210 receive, from a second device 220, first control information for scheduling a second transmission of the second device 220 and feedback information associated with the second transmission, and second control information for scheduling a third transmission of the first device 210. The second transmission may be a DL data transmission, and the third transmission may be a UL data transmission on PUSCH format 1.

In some example embodiments, the feedback information may comprise HARQ-ACK/NACK feedback of the second transmission.

In some example embodiments, the first control information may be based on DCI format N0, and the second control information may be based on DCI format N1.

At 620, the first device 210 decodes, based on the first control information, the second transmission from the second device 220.

At 630, the first device 210 generates, based on the decoding result, a first transmission comprising the feedback information and the third transmission comprising at least a duplication of the feedback information. The first transmission may be a UL data transmission on PUSCH format 2.

In some example embodiments, the feedback information may be contained in a MAC PDU header of the third transmission. For example, the feedback information may be contained in a reserved bit (e.g., R bit) in the MAC PDU header.

In some example embodiments, the feedback information may be contained in a MAC CE of the third transmission.

In some example embodiments, the feedback information may comprise a first HARQ feedback corresponding to a first HARQ process and a second HARQ feedback corresponding to a second HARQ process, and the first HARQ process precedes the second HARQ process.

In some example embodiments, a duplication of the first HARQ feedback may be contained in a first reserved bit in a MAC PDU header of the third transmission, and a duplication of the second HARQ feedback may be contained in a second reserved bit in the MAC PDU header of the third transmission.

In the above embodiments, the order of the first reserved bit and the second reserved bit in the MAC PDU header may be preconfigured at the first device 210 and the second device 220.

In some example embodiments, a duplication of the first HARQ feedback may be contained in a first bit in a MAC CE of the third transmission, and a duplication of the second HARQ feedback may be contained in a second bit in the MAC CE of the third transmission. The order of the first bit and the second bit in the MAC CE are preconfigured at the first device 210 and the second device 220.

In some example embodiments, if the decoding of the second transmission is successful, the first device 210 may generate the first transmission comprising HARQ-ACK feedback and the second transmission comprising the duplication of the HARQ-ACK feedback. Otherwise, if the decoding of the second transmission is unsuccessful, the first device 210 may generate the first transmission comprising HARQ-NACK feedback and the third transmission comprising the duplication of the HARQ-NACK feedback.

At 640, the first device 210 transmits, to the second device 220 and based on the first control information, the first transmission.

At 650, the first device 210 transmits, to the second device 220 and based on the second control information, the third transmission.

In some example embodiments, the first transmission may be transmitted based on PUSCH format 2, and the third transmission may be transmitted based on PUSCH format 1.

In some example embodiments, upon transmitting the first transmission, the first device 210 may initiate at least one duplication timer associated with the duplication of the feedback information. If the second control information is received before the at least one duplication timer expires, the first device 210 may transmit the duplication of the feedback information in the third transmission.

In some example embodiments, the first device 210 may be configured with a first HARQ process and a second HARQ process, and thus the at least one duplication timer may comprise a first duplication timer associated with the first HARQ process, and a second duplication timer associated with the second HARQ process.

In the above embodiments, the first device 210 may determine whether the first duplication timer and the second duplication timer expire. If the first duplication timer expires, while the second duplication timer does not expire, the first device 210 may generate the third transmission comprising a duplication of a second HARQ feedback corresponding to the second HARQ process. If the second duplication timer expires, while the first duplication does not expire, the first device 210 may generate the third transmission comprising a duplication of a first HARQ feedback corresponding to the first HARQ process. If none of the first duplication timer and the second duplication timer expires, the first device 210 may generate the third transmission comprising the duplication of the first HARQ feedback and the duplication of the second HARQ feedback.

In some example embodiments, the duration of the duplication timer may be configured by the second device 220. Alternatively, in some other example embodiments, the duration of the duplication timer may be preconfigured at the first device 210 and the second device 220.

In some example embodiments, the first device 210 and the second device 220 may communicate via a NTN.

In some example embodiments, the first device 210 may comprise a terminal device, and the second device 220 may comprise a network device.

According to the example embodiments, there is provided an enhanced HARQ feedback mechanism. In the HARQ feedback mechanism, the HARQ feedback for DL data transmission is duplicated and transmitted separately in both NPUSCH format 1 and NPUSCH format 2. As such, the reliability of HARQ feedback in NB-IoT is enhanced, which in turn improves the efficiency of DL data transmissions and reduces frequency resources as well as the power consumption of the UE. In addition, since the duplication of the HARQ feedback can be carried in the MAC PDU header or MAC CE, the proposed HARQ feedback procedure would not cause additional resources to be allocated for the PUSCH format 1.

Figure 7:
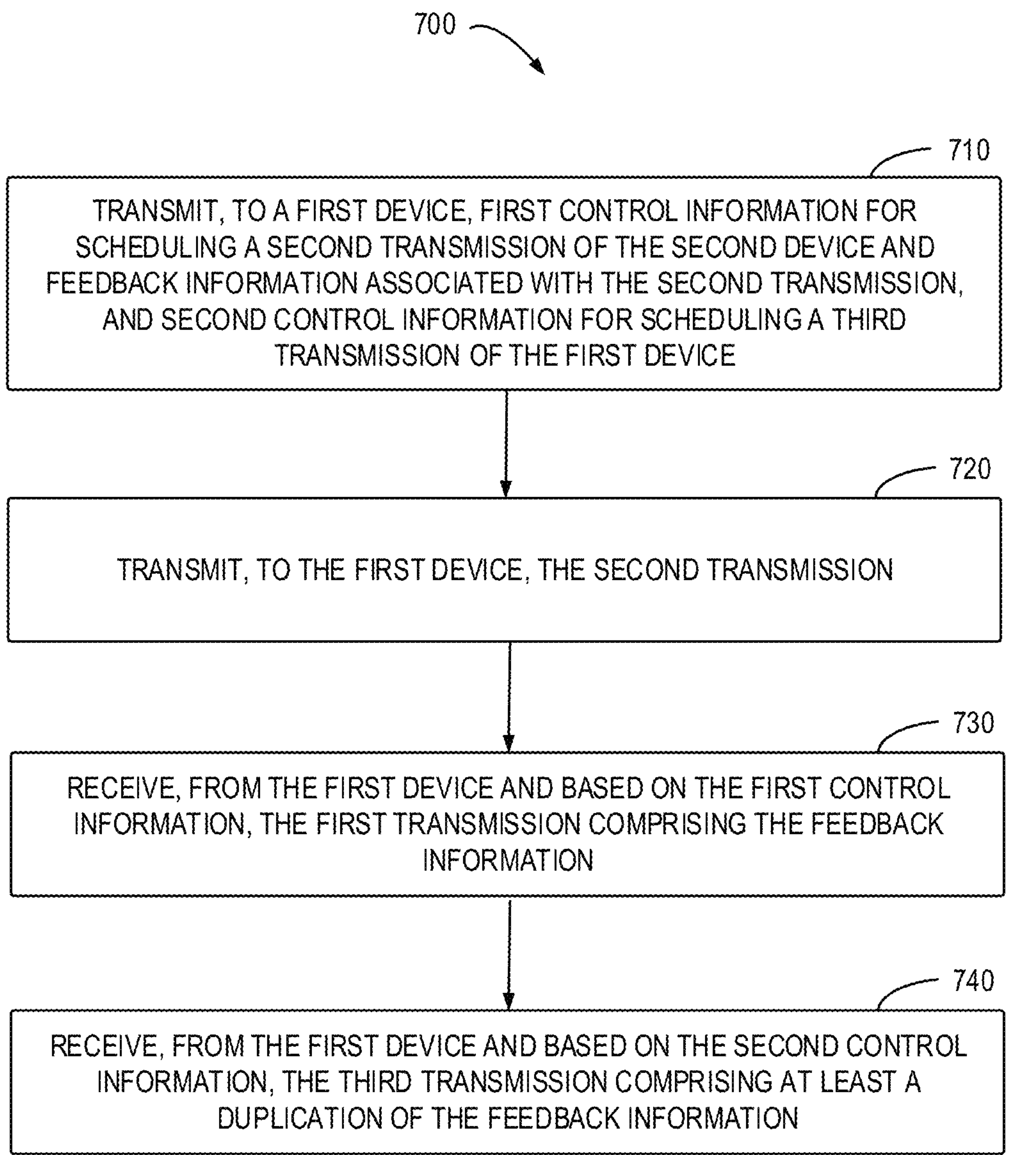
FIG. 7 illustrates a flowchart of an example method implemented at a second device according to example embodiments of the present disclosure.

FIG. 7 illustrates a flowchart of an example method 700 implemented at a second device according to example embodiments of the present disclosure. The method 700 can be implemented by a base station or a gNB, such as, the second device 220 shown in FIG. 2. It is to be understood that method 700 may further include additional blocks not shown and/or omit some shown blocks, and the scope of the present disclosure is not limited in this regard.

At 710, the second device 220 transmits, to a first device 210, first control information for scheduling a second transmission of the second device 220 and feedback information associated with the second transmission, and second control information for scheduling a third transmission of the first device 210. The second transmission may be a DL data transmission, and the third transmission may be a UL data transmission on PUSCH format 1.

In some example embodiments, the first control information may be based on DCI format N0, and the second control information may be based on DCI format N1.

In some example embodiments, the first transmission may be transmitted based on PUSCH format 2, and the third transmission may be transmitted based on PUSCH format 1.

At 720, the second device 220 transmits, to the first device 210, the second transmission.

At 730, the second device 220 receives, from the first device 210 and based on the first control information, a first transmission comprising the feedback information. The first transmission may be a UL data transmission on PUSCH format 2.

At 740, the second device 220 receives, from the first device 210 and based on the second control information, the third transmission comprising at least a duplication of the feedback information.

In some example embodiments, the second device 220 may determine whether the decoding of the first transmission is successful. Upon receipt of the third transmission, the second device 220 may obtain the duplication of the feedback information by decoding the third transmission.

The feedback information may comprise HARQ-ACK/NACK feedback of the second transmission. In some example embodiments In a case where HARQ-ACK on NPUSCH format 2 is not obtained and the duplication of the HARQ-ACK feedback is obtained, the second device 220 may not retransmit the second transmission to the first device 210. In this way, unnecessary retransmission can be avoided in the HARQ feedback mechanism according to the example embodiments.

In some example embodiments, the second device 220 may transmit, to the first device 210, a message for configuring at least one duplication timer associated with the duplication of the feedback information. The duplication of the feedback information is to be transmitted in the third transmission before the duplication timer expires. Alternatively, in some other example embodiments, the duration of the duplication timer may be preconfigured at the first device 210 and the second device 220.

In some example embodiments, a first HARQ process and a second HARQ process may be configured for the first device 210, and thus the at least one duplication timer may comprise a first duplication timer associated with the first HARQ process, and a second duplication timer associated with the second HARQ process.

In some example embodiments, the feedback information may be contained in a MAC PDU header of the third transmission. For example, the feedback information may be contained in a reserved bit (e.g., R bit) in the MAC PDU header.

In some example embodiments, the feedback information may be contained in a MAC CE of the third transmission.

In some example embodiments, the feedback information may comprise a first HARQ feedback corresponding to a first process and a second HARQ feedback corresponding to a second process, and the first HARQ process precedes the second HARQ process.

In some example embodiments, a duplication of the first HARQ feedback may be contained in a first reserved bit in a MAC PDU header of the third transmission, and a duplication of the second HARQ feedback is contained in a second reserved bit in the MAC PDU header of the third transmission.

In the above embodiments, the order of the first reserved bit and the second reserved bit in the MAC PDU header may be preconfigured at the first device 210 and the second device 220.

In some example embodiments, a duplication of the first HARQ feedback may be contained in a first bit of a MAC CE of the third transmission, and a duplication of the second HARQ feedback may be contained in a second bit of the MAC CE of the third transmission. The order of the first bit and the second bit in the MAC CE may be preconfigured at the first device 210 and the second device 220.

In some example embodiments, the first device 210 and the second device 220 may communicate via a NTN.

In some example embodiments, the first device 210 may comprise a terminal device, and the second device 220 may comprise a network device.

According to the example embodiments, there is provided an enhanced HARQ feedback mechanism. Based on the HARQ feedback mechanism, the HARQ feedback for DL data transmission is duplicated and transmitted separately in both NPUSCH format 1 and NPUSCH format 2. As such, the reliability of HARQ feedback in NB-IoT is enhanced, which in turn improves the efficiency of DL data transmissions and reduces frequency resources as well as the power consumption of the UE.

In some example embodiments, a first apparatus capable of performing any of the method 600 (for example, the first device 210) may comprise means for performing the respective steps of the method 600. The means may be implemented in any suitable form. For example, the means may be implemented in a circuitry or software module.

In some example embodiments, the first apparatus comprises: means for receiving, from a second apparatus, first control information for scheduling a second transmission of the second apparatus and feedback information associated with the second transmission, and second control information for scheduling a third transmission of the first apparatus; means for decoding, based on the first control information, the second transmission from the second apparatus; means for generating, based on the decoding result, a first transmission comprising the feedback information and the third transmission comprising at least a duplication of the feedback information; means for transmitting, to the second apparatus and based on the first control information, the first transmission; and means for transmitting, to the second apparatus and based on the second control information, the third transmission.

In some example embodiments, the first apparatus further comprises: means for upon transmitting the first transmission, initiating at least one duplication timer associated with the duplication of the feedback information; and means for in accordance with a determination that the second control information is received before the at least one duplication timer expires, transmitting the duplication of the feedback information in the third transmission.

In some example embodiments, a first HARQ process and a second HARQ process are configured for the first apparatus, the at least one duplication timer comprises a first duplication timer associated with the first HARQ process, and a second duplication timer associated with the second HARQ process.

In some example embodiments, the means for generating the third transmission comprises: means for determining whether the first duplication timer and the second duplication timer expire; means for in accordance with a determination that the first duplication timer expires, while the second duplication timer does not expire, generating the third transmission comprising a duplication of a second HARQ feedback corresponding to the second HARQ process; means for in accordance with a determination that the second duplication timer expires, while the first duplication does not expire, generating the third transmission comprising a duplication of a first HARQ feedback corresponding to the first HARQ process; and means for in accordance with a determination that none of the first duplication timer and the second duplication timer expires, generating the third transmission comprising the duplication of the first HARQ feedback and the duplication of the second HARQ feedback.

In some example embodiments, duration of the duplication timer is configured by the second apparatus, or preconfigured at the first apparatus and the second apparatus.

In some example embodiments, the feedback information comprises Hybrid Automatic Repeat Request, HARQ-ACK/NACK feedback of the second transmission.

In some example embodiments, the means for generating the first transmission and the third transmission comprises: means for in accordance with a determination that the decoding of the second transmission is successful, generating the first transmission comprising HARQ-ACK feedback and the second transmission comprising the duplication of the HARQ-ACK feedback; and means for in accordance with a determination that the decoding of the second transmission is unsuccessful, generating the first transmission comprising HARQ-NACK feedback and the third transmission comprising the duplication of the HARQ-NACK feedback.

In some example embodiments, the first transmission is transmitted based on PUSCH format 2, and the third transmission is transmitted based on PUSCH format 1.

In some example embodiments, the feedback information is contained in a MAC protocol data unit, PDU, header of the third transmission.

In some example embodiments, the feedback information is contained in a reserved bit in the MAC PDU header.

In some example embodiments, the feedback information is contained in a MAC control element, CE, of the third transmission.

In some example embodiments, the feedback information comprises a first Hybrid Automatic Repeat Request, HARQ, feedback corresponding to a first process and a second HARQ feedback corresponding to a second process, and the first HARQ process is precedes the second HARQ process.

In some example embodiments, a duplication of the first HARQ feedback is contained in a first reserved bit in a MAC protocol data unit, PDU, header of the third transmission, and a duplication of the second HARQ feedback is contained in a second reserved bit in the MAC PDU header of the third transmission, and the order of the first reserved bit and the second reserved bit in the MAC PDU header are preconfigured at the first apparatus and the second apparatus.

In some example embodiments, a duplication of the first HARQ feedback is contained in a first bit of a MAC CE of the third transmission, and a duplication of the second HARQ feedback is contained in a second bit of a MAC CE of the third transmission, the order of the first bit and the second bit in the MAC CE are preconfigured at the first apparatus and the second apparatus.

In some example embodiments, the first apparatus and the second apparatus communicate via a non-terrestrial network, NTN.

In some example embodiments, the first apparatus comprises a terminal device, and a second apparatus comprises a network device.

In some example embodiments, a second apparatus capable of performing any of the method 700 (for example, the second device 220) may comprise means for performing the respective steps of the method 700. The means may be implemented in any suitable form. For example, the means may be implemented in a circuitry or software module.

In some example embodiments, the second apparatus comprises: means for transmitting, to a first apparatus, first control information for scheduling a second transmission of the second apparatus and feedback information associated with the second transmission, and second control information for scheduling a third transmission of the first apparatus; means for transmitting, to the first apparatus, the second transmission; means for receiving, from the first apparatus and based on the first control information, the first transmission comprising the feedback information; and means for receiving, from the first apparatus and based on the second control information, the third transmission comprising at least a duplication of the feedback information.

In some example embodiments, the second apparatus further comprises: means for in accordance with receipt of the third transmission, obtaining the duplication of the feedback information by decoding the third transmission.

In some example embodiments, the second apparatus further comprises: means for transmitting, to the first apparatus, a message for configuring at least one duplication timer to be initiated upon transmitting the first transmission, wherein the duplication of the feedback information is to be transmitted in the third transmission before the at least one duplication timer expires.

In some example embodiments, a first HARQ process and a second HARQ process are configured for the first apparatus, and the at least one duplication timer comprises a first duplication timer associated with the first HARQ process, and a second duplication timer associated with the second HARQ process.

In some example embodiments, the first transmission is transmitted based on PUSCH format 2, and the third transmission is transmitted based on PUSCH format 1.

In some example embodiments, the feedback information is contained in a MAC protocol data unit, PDU, header of the third transmission.

In some example embodiments, the feedback information is contained in a reserved bit in the MAC PDU header.

In some example embodiments, the feedback information is contained in a MAC control element, CE, of the third transmission.

In some example embodiments, the feedback information comprises a first Hybrid Automatic Repeat Request, HARQ, feedback corresponding to a first process and a second HARQ feedback corresponding to a second process, and the first HARQ process is precedes the second HARQ process.

In some example embodiments, a duplication of the first HARQ feedback is contained in a first reserved bit in a MAC protocol data unit, PDU, header of the third transmission, and a duplication of the second HARQ feedback is contained in a second reserved bit in the MAC PDU header of the third transmission, and the order of the first reserved bit and the second reserved bit in the MAC PDU header are preconfigured at the first apparatus and the second apparatus.

In some example embodiments, a duplication of the first HARQ feedback is contained in a first bit of a MAC CE of the third transmission, and a duplication of the second HARQ feedback is contained in a second bit of the MAC CE of the third transmission, and wherein the order of the first bit and the second bit in the MAC CE are preconfigured at the first device and the second device.

In some example embodiments, the first apparatus and the second apparatus communicate via a non-terrestrial network, NTN.

In some example embodiments, the first apparatus comprises a terminal device, and a second apparatus comprises a network device.

Figure 8:
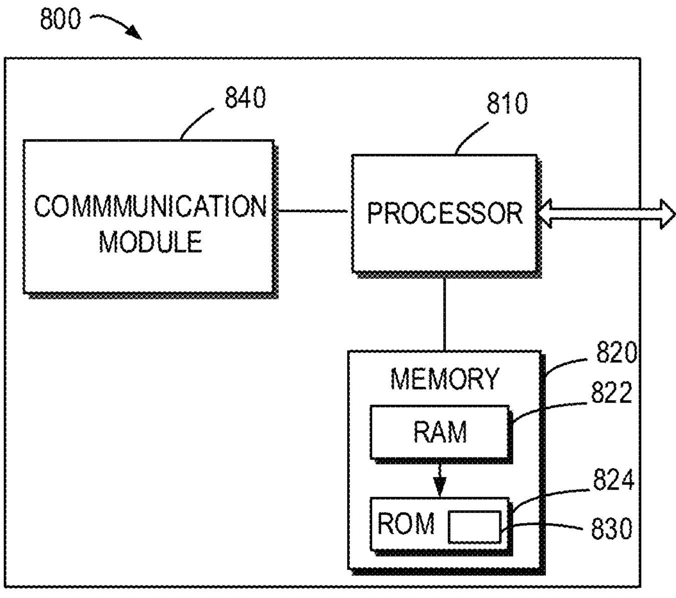
FIG. 8 illustrates a simplified block diagram of an apparatus that is suitable for implementing example embodiments of the present disclosure.

FIG. 8 is a simplified block diagram of a device 800 that is suitable for implementing embodiments of the present disclosure. The device 800 may be provided to implement the communication device, for example the first device 210 and the second device 220 as shown in FIG. 2. As shown, the device 800 includes one or more processors 810, one or more memories 820 coupled to the processor 810, and one or more transmitters and/or receivers (TX/RX) 840 coupled to the processor 810.

The TX/RX 840 may be configured for bidirectional communications. The TX/RX 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage media. Examples of the volatile memories include, but are not limited to, a random access memory (RAM) 822 and other volatile memories that will not last in the power-down duration.

A computer program 830 includes computer executable instructions that may be executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIG. 3. The embodiments of the present disclosure may also be implemented by hardware or by a combination of software and hardware.

Figure 9:
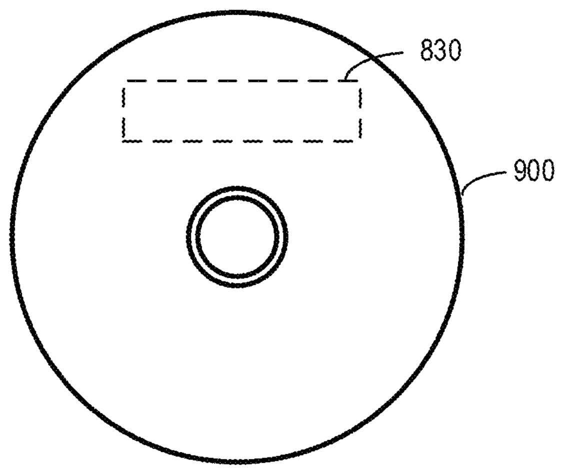
FIG. 9 illustrates a block diagram of an example computer readable medium in accordance with example embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations. It is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 700 as described above with reference to FIGS. 6-7. Generally, program modules may include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory including computer program codes;

the at least one memory and the computer program codes are configured to, with the at least one processor, cause the first device at least to:

receive, from a second device, first control information for scheduling a second transmission of the second device and feedback information associated with the second transmission, and second control information for scheduling a third transmission of the first device;

decode, based on the first control information, the second transmission from the second device;

generate, based on the decoding result, a first transmission comprising the feedback information;

transmit, to the second device and based on the first control information, the first transmission;

upon transmitting the first transmission, initiate at least one duplication timer associated with the duplication of the feedback information, wherein a first HARQ process and a second HARQ process are configured for the first device, and wherein the at least one duplication timer comprises a first duplication timer associated with the first HARQ process, and a second duplication timer associated with the second HARQ process, and wherein the first HARQ process precedes the second HARQ process;

in accordance with a determination that none of the first duplication timer and the second duplication timer expires and based on the decoding result, generate the third transmission comprising the duplication of the first HARQ feedback and the duplication of the second HARQ feedback, wherein the duplication of the first HARQ feedback is contained in a first reserved bit in a MAC protocol data unit, PDU, header of the third transmission, and the duplication of the second HARQ feedback is contained in a second reserved bit in the MAC PDU header of the third transmission, and the order of the first reserved bit and the second reserved bit in the MAC PDU header are preconfigured at the first device and the second device; and transmit, to the second device and based on the second control information, the third transmission.

2. The first device of claim 1, wherein a duration of the duplication timer is configured by the second device or preconfigured at the first device and the second device.

3. The first device of claim 2, wherein the feedback information comprises HARQ-ACK/NACK feedback of the second transmission.

4. The first device of claim 3, wherein the at least one memory and the computer program codes are configured to, with the at least one processor, cause the first device to generate the first transmission and the third transmission by:

in accordance with a determination that the decoding of the second transmission is unsuccessful, generating the first transmission comprising HARQ-NACK feedback and the third transmission comprising the duplication of the HARQ-NACK feedback.

5. The first device of claim 3, wherein the at least one memory and the computer program codes are configured to, with the at least one processor, cause the first device to generate the first transmission and the third transmission by:

in accordance with a determination that the decoding of the second transmission is successful, generating the first transmission comprising HARQ-ACK feedback and the second transmission comprising the duplication of the HARQ-ACK feedback.

6. The first device of claim 5, wherein the first transmission is transmitted based on PUSCH format 2, and the third transmission is transmitted based on PUSCH format 1.

7. The first device of claim 6, wherein the first device and the second device communicate via a non-terrestrial network.

8. The first device of claim 7, wherein the first device comprises a user equipment and the second device comprises a network device.

9. A system comprising:

a user equipment comprising:

a processor; and a non-transitory computer-readable medium that, when executed by the processor, causes the processor to perform the following operations:

receive, from a network device, first control information for scheduling a second transmission of the network device and feedback information associated with the second transmission, and second control information for scheduling a third transmission of the user equipment;

decode, based on the first control information, the second transmission from the network device;

generate, based on the decoding result, a first transmission comprising the feedback information;

transmit, to the network device and based on the first control information, the first transmission;

upon transmitting the first transmission, initiate at least one duplication timer associated with the duplication of the feedback information, wherein a first HARQ process and a second HARQ process are configured for the user equipment device, and wherein the at least one duplication timer comprises a first duplication timer associated with the first HARQ process, and a second duplication timer associated with the second HARQ process, and wherein the first HARQ process precedes the second HARQ process;

in accordance with a determination that none of the first duplication timer and the second duplication timer expires and based on the decoding result, generate the third transmission comprising the duplication of the first HARQ feedback and the duplication of the second HARQ feedback, wherein the duplication of the first HARQ feedback is contained in a first reserved bit in a MAC protocol data unit, PDU, header of the third transmission, and the duplication of the second HARQ feedback is contained in a second reserved bit in the MAC PDU header of the third transmission, and the order of the first reserved bit and the second reserved bit in the MAC PDU header are preconfigured at the user equipment device and the network device; and transmit, to the network device and based on the second control information, the third transmission.

10. The system of claim 9, wherein a duration of the duplication timer is configured by the network device or preconfigured at the user equipment and the network device.

11. The system of claim 10, wherein the feedback information comprises HARQ-ACK/NACK feedback of the second transmission.

12. The system of claim 11, wherein the computer-executable instructions further cause the processor to generate the first transmission and the third transmission by:

in accordance with a determination that the decoding of the second transmission is unsuccessful, generating the first transmission comprising HARQ-NACK feedback and the third transmission comprising the duplication of the HARQ-NACK feedback.

13. The system of claim 11, wherein the computer-executable instructions further cause the processor to generate the first transmission and the third transmission by:

in accordance with a determination that the decoding of the second transmission is successful, generating the first transmission comprising HARQ-ACK feedback and the second transmission comprising the duplication of the HARQ-ACK feedback.

14. The system of claim 12, wherein the first transmission is transmitted based on PUSCH format 2, and the third transmission is transmitted based on PUSCH format 1.

15. The system of claim 14, wherein the user equipment and the network device communicate via a non-terrestrial network.

16. A method comprising:

receiving, by a user equipment from a network device, first control information for scheduling a second transmission of the network device and feedback information associated with the second transmission, and second control information for scheduling a third transmission of the user equipment;

decoding, by the user equipment based on the first control information, the second transmission from the network device;

generating, by the user equipment based on the decoding result, a first transmission comprising the feedback information;

transmitting, by the user equipment to the network device and based on the first control information, the first transmission;

upon transmitting the first transmission, initiating, by the user equipment, at least one duplication timer associated with the duplication of the feedback information, wherein a first HARQ process and a second HARQ process are configured for the user equipment device, and wherein the at least one duplication timer comprises a first duplication timer associated with the first HARQ process, and a second duplication timer associated with the second HARQ process, and wherein the first HARQ process precedes the second HARQ process;

in accordance with a determination that none of the first duplication timer and the second duplication timer expires and based on the decoding result, generating, by the user equipment, the third transmission comprising the duplication of the first HARQ feedback and the duplication of the second HARQ feedback, wherein the duplication of the first HARQ feedback is contained in a first reserved bit in a MAC protocol data unit, PDU, header of the third transmission, and the duplication of the second HARQ feedback is contained in a second reserved bit in the MAC PDU header of the third transmission, and the order of the first reserved bit and the second reserved bit in the MAC PDU header are preconfigured at the user equipment device and the network device; and transmitting, by the user equipment, to the network device and based on the second control information, the third transmission.

17. The method of claim 16, wherein a duration of the duplication timer is configured by the network device or preconfigured at the user equipment and the network device.

18. The method of claim 17, wherein the feedback information comprises HARQ-ACK/NACK feedback of the second transmission.

19. The method of claim 18, further comprising generating the first transmission and the third transmission by:

in accordance with a determination that the decoding of the second transmission is unsuccessful, generating the first transmission comprising HARQ-NACK feedback and the third transmission comprising the duplication of the HARQ-NACK feedback; and in accordance with a determination that the decoding of the second transmission is successful, generating the first transmission comprising HARQ-ACK feedback and the second transmission comprising the duplication of the HARQ-ACK feedback.

20. The method of claim 19, wherein the first transmission is transmitted based on PUSCH format 2, and the third transmission is transmitted based on PUSCH format 1, and wherein the user equipment and the network device communicate via a non-terrestrial network.

* * * * *